(12) United States Patent
Tseng et al.

(10) Patent No.: US 12,477,457 B2
(45) Date of Patent: Nov. 18, 2025

(54) BASE STATION, USER EQUIPMENT, AND METHOD FOR POWER SAVING CONFIGURATION

(71) Applicant: SHARP KABUSHIKI KAISHA, Sakai (JP)

(72) Inventors: Yung-Lan Tseng, Taipei (TW); Chia-Hsin Lai, Taipei (TW); Hsin-Hsi Tsai, Taipei (TW); Mei-Ju Shih, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 380 days.

(21) Appl. No.: 17/976,746

(22) Filed: Oct. 28, 2022

(65) Prior Publication Data

US 2023/0199643 A1    Jun. 22, 2023

Related U.S. Application Data

(60) Provisional application No. 63/263,226, filed on Oct. 28, 2021.

(51) Int. Cl.
*H04W 52/02* (2009.01)
*H04W 76/20* (2018.01)

(52) U.S. Cl.
CPC ....... *H04W 52/0206* (2013.01); *H04W 76/20* (2018.02)

(58) Field of Classification Search
CPC .......................... H04W 52/0206; H04W 76/20
See application file for complete search history.

(56) References Cited

U.S. PATENT DOCUMENTS

2020/0092814 A1    3/2020   Zhou et al.
2021/0144717 A1*   5/2021   Tsai .................. H04W 8/24
2022/0394520 A1*   12/2022  Shokri Razaghi ..........
                                           H04W 74/0866

(Continued)

FOREIGN PATENT DOCUMENTS

WO    2021063875 A1    4/2021
WO    2021179942 A1    9/2021

OTHER PUBLICATIONS

Ericsson, "UE power saving using search space set switching", 3GPP TSG RAN WG1 #101-e e-Meeting, May 25-Jun. 5, 2020, R1-2004360.

(Continued)

*Primary Examiner* — Sujoy K Kundu
*Assistant Examiner* — Weibin Huang
(74) *Attorney, Agent, or Firm* — ScienBiziP, P.C.

(57) ABSTRACT

A method performed by a base station (BS) for power saving configuration is provided. The method includes receiving at least one of a first Resource Control (RRC) parameter or a second RRC parameter, the first RRC parameter indicating that a user equipment (UE) supports a first search space set group (SSSG) switching mechanism, and the second RRC parameter indicating that the UE supports a second SSSG switching mechanism; and transmitting, to the UE, one or more physical downlink control channel (PDCCH) configurations including one or more third RRC parameters, all of the one or more third RRC parameters indicating a same one of the first SSSG switching mechanism and the second SSSG switching mechanism.

17 Claims, 7 Drawing Sheets

(56) References Cited

U.S. PATENT DOCUMENTS

| | | | |
|---|---|---|---|
| 2023/0188305 A1* | 6/2023 | Bagheri | ................ H04L 5/0053 370/329 |
| 2023/0328652 A1* | 10/2023 | Zhou | ................. H04W 52/0235 370/318 |
| 2024/0195572 A1* | 6/2024 | Niu | ....................... H04L 5/0094 |

OTHER PUBLICATIONS

Ericsson: "DL signals and channels for NR-U", R1-1912707, 3GPP TSG-RAN WG1 Meeting #98bis Reno, USA, [sp] Nov. 18-22, 2019. (Nov. 9, 2019).

* cited by examiner

BASE STATION, USER EQUIPMENT, AND METHOD FOR POWER SAVING CONFIGURATION

CROSS-REFERENCE TO RELATED APPLICATION(S)

The present disclosure claims the benefit of and priority to U.S. Provisional Patent Application Ser. No. 63/263,226, filed on Oct. 28, 2021, entitled "LAYER-1 POWER SAVING CONFIGURATION," the content of which is hereby incorporated fully by reference into the present disclosure for all purposes.

FIELD

The present disclosure is related to wireless communication and, more specifically, to base station (BS), user equipment (UE), and method for power saving configuration.

BACKGROUND

Various efforts have been made to improve different aspects of wireless communication for cellular wireless communication systems, such as 5th Generation (5G) New Radio (NR), by improving data rate, latency, reliability, and mobility. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a base station (BS), a user equipment (UE), and a method for power saving configuration.

In a first aspect of the present disclosure, a method performed by a BS for power saving configuration is provided. The method includes receiving at least one of a first Resource Control (RRC) parameter or a second RRC parameter, the first RRC parameter indicating that a UE supports a first search space set group (SSSG) switching mechanism, and the second RRC parameter indicating that the UE supports a second SSSG switching mechanism; and transmitting, to the UE, one or more physical downlink control channel (PDCCH) configurations comprising one or more third RRC parameters, all of the one or more third RRC parameters indicating a same one of the first SSSG switching mechanism and the second SSSG switching mechanism.

In an implementation of the first aspect, the first SSSG switching mechanism is in compliance with release 16 of third Generation Partnership Project (3GPP) Technical Specification (TS) for fifth generation (5G) New Radio (NR), and the second SSSG switching mechanism is in compliance with release 17 of 3GPP TS for 5G NR.

In another implementation of the first aspect, the UE is configured with one or more cell groups, and the same one of the first SSSG switching mechanism and the second SSSG switching mechanism is applied to all of the one or more cell groups.

In another implementation of the first aspect, the UE is configured with a plurality of frequency carriers, each of the plurality of frequency carriers is on a licensed band or an unlicensed band, and the same one of the first SSSG switching mechanism and the second SSSG switching mechanism is applied to all of the plurality of frequency carriers.

In another implementation of the first aspect, the UE is configured with one or more downlink (DL) bandwidth parts (BWPs) associated with a serving cell, and the same one of the first SSSG switching mechanism and the second SSSG switching mechanism is applied to all of the one or more DL BWPs.

In another implementation of the first aspect, the second RRC parameter further indicates that the UE supports PDCCH skipping.

In another implementation of the first aspect, the one or more third RRC parameters in different PDCCH configurations are configured with different or same content values.

In a second aspect of the present disclosure, a BS for power saving configuration is provided. The BS includes one or more processors and at least one memory coupled to at least one of the one or more processors, where the at least one memory stores computer-executable instructions that, when executed by the at least one of the one or more processors, cause the UE to receive at least one of a first RRC parameter or a second RRC parameter, the first RRC parameter indicating that the UE supports a first SSSG switching mechanism, and the second RRC parameter indicating that the UE supports a second SSSG switching mechanism; and transmit, to the UE, one or more PDCCH configurations comprising one or more third RRC parameters, all of the one or more third RRC parameters indicating a same one of the first SSSG switching mechanism and the second SSSG switching mechanism.

In a third aspect of the present disclosure, a method performed by a UE for power saving configuration is provided. The method includes transmitting, to a BS, a first RRC parameter indicating that the UE supports a first SSSG switching mechanism and a second RRC parameter indicating that the UE supports a second SSSG switching mechanism; receiving, from the BS, one or more PDCCH configurations comprising one or more third RRC parameters, all of the one or more third RRC parameters indicating a same one of the first SSSG switching mechanism and the second SSSG switching mechanism; and switching from a first SSSG to a second SSSG according to the same one of the first SSSG switching mechanism and the second SSSG switching mechanism.

In an implementation of the third aspect, the first SSSG switching mechanism is in compliance with release 16 of 3GPP TS for 5G NR, and the second SSSG switching mechanism is in compliance with release 17 of 3GPP TS for 5G NR.

In another implementation of the third aspect, the UE is configured with one or more cell groups, and the same one of the first SSSG switching mechanism and the second SSSG switching mechanism is applied to all of the one or more cell groups.

In another implementation of the third aspect, the UE is configured with a plurality of frequency carriers, each of the plurality of frequency carriers is on a licensed band or an unlicensed band, and the same one of the first SSSG switching mechanism and the second SSSG switching mechanism is applied to all of the plurality of frequency carriers.

In another implementation of the third aspect, the UE is configured with one or more DL BWPs associated with a serving cell, and the same one of the first SSSG switching mechanism and the second SSSG switching mechanism is applied to all of the one or more DL BWPs.

In another implementation of the third aspect, the one or more third RRC parameters in different PDCCH configurations are configured with different or same content values.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
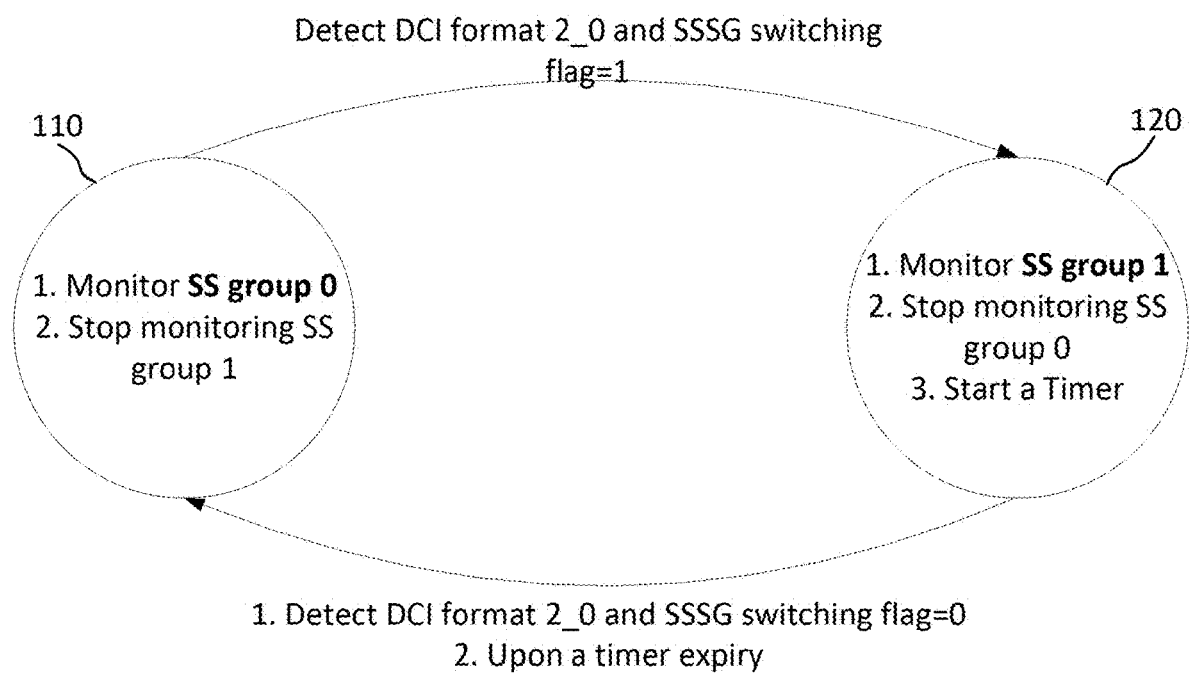
FIG. 1 is a diagram illustrating an explicit SSSG switching mechanism, according to an example implementation of the present disclosure.

Some of the abbreviations used in this disclosure include:

| Abbreviation | Full name |
| --- | --- |
| 3GPP | 3$^{rd}$ Generation Partnership Project |
| 5G | 5$^{th}$ Generation |
| ACK | Acknowledgment |
| AS | Access Stratum |
| ASN.1 | Abstract Syntax Notation One |
| BS | Base Station |
| BWP | Bandwidth Part |
| C-RNTI | Cell Radio Network Temporary Identifier |
| C-DRX | Connected mode Discontinuous Reception |
| CA | Carrier Aggregation |
| CG | Configured Grant |
| CN | Core Network |
| CRC | Cyclic Redundancy Check |
| CSS | Common Search Space |
| DC | Dual Connectivity |
| DCI | Downlink Control Information |
| DL | Downlink |
| E-UTRA | Evolved Universal Terrestrial Radio Access |
| E-UTRAN | Evolved Universal Terrestrial Radio Access Network |
| EN-DC | E-UTRAN New Radio-Dual Connectivity |
| GNSS | Global Navigation Satellite System |
| GW | Gateway |
| HARQ | Hybrid Automatic Repeat Request |
| HARQ-ACK | HARQ Acknowledgement |
| IE | Information Element |
| IoT | Internet of Things |
| L1 | Layer-1 |
| LTE | Long-Term Evolution |
| MAC | Medium Access Control |
| MAC CE | MAC Control Element |

-continued

| Abbreviation | Full name |
| --- | --- |
| MCG | Master Cell Group |
| MCS | Modulation Coding Scheme |
| MN | Master Node |
| NAS | Non-Access Stratum |
| NB-IoT | Narrowband Internet of Things |
| NE-DC | New Radio E-UTRAN-Dual Connectivity |
| NG-RAN | Next Generation-Radio Access Network |
| NGEN-DC | NG-RAN E-UTRAN New Radio-Dual Connectivity |
| NR | New Radio |
| NR-DC | New Radio-Dual Connectivity |
| NW | Network |
| OFDM | Orthogonal Frequency Division Multiplexing |
| PCell | Primary Cell |
| PDCCH | Physical Downlink Control Channel |
| PDSCH | Physical Downlink Shared Channel |
| PUCCH | Physical Uplink Control Channel |
| PUSCH | Physical Uplink Shared Channel |
| RA | Random Access |
| RB | Radio Bearer |
| RAN | Radio Access Network |
| Rel | Release |
| RF | Radio Frequency |
| RNTI | Radio Network Temporary Identifier |
| RRC | Radio Resource Control |
| RS | Reference Signal |
| SCell | Secondary Cell |
| SCG | Secondary Cell Group |
| SCS | Sub-Carrier Spacing |
| SN | Secondary Node |
| SPS | Semi-Persistent Scheduling |
| SRB | Signaling Radio Bearer |
| SSSG | Search Space Set Group |
| TB | Transport Block |
| TS | Technical Specification |
| UE | User Equipment |
| UL | Uplink |
| URLLC | Ultra-Reliable and Low-Latency Communication |
| USS | User-specific Search Space |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

References to "one implementation," "an implementation," "example implementation," "various implementations," "some implementations," "implementations of the present disclosure," etc., may indicate that the implementation(s) of the present disclosure so described may include a particular feature, structure, or characteristic, but not every possible implementation of the present disclosure necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent.

The expression "at least one of A, B and C" or "at least one of the following: A, B and C" means "only A, or only B, or only C, or any combination of A, B and C." The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details, such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software, or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or using one or more Digital Signal Processor (DSPs). Although some of the disclosed implementations are oriented to software installed and executing on computer hardware, alternative implementations implemented as firmware, as hardware, or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT), such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As previously disclosed, the frame structure for NR supports flexible configurations for accommodating various next-generation (e.g., 5G) communication requirements, such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3GPP may serve as a baseline for an NR waveform. The scalable OFDM numerology, such as adaptive sub-carrier spacing, channel bandwidth, and Cyclic Prefix (CP), may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

In Rel-16 (referred to herein as R-16) of 3GPP TSs, L1 power saving mechanisms, such as SSSG switching and PDCCH skipping, are introduced to enhance the power saving gain via dynamic control. However, in Rel-16, the L1 power saving mechanisms (e.g., SSSG switching) is only implemented on NR unlicensed bands.

In Rel-17 (referred to herein as R-17), further enhancements on L1 power saving mechanisms are under discussion. For example, the L1 power saving mechanisms in Rel-17 would not be limited to unlicensed bands only. That is, the L1 power saving mechanisms in Rel-17 may be applicable to both licensed bands and unlicensed bands. With the achievements in Rel-16 and Rel-17 of 3GPP TSs so far, there are still some pending issues as follows.

(1) Could the L1 power saving mechanisms designed for different RATs or different frequency carriers (e.g., NR on license bands and unlicensed bands) co-exist in one UE?

(2) Further optimization and enhancement on the signaling design are required, especially when the L1 power saving mechanisms in different releases (e.g., R-16 and R-17) are considered jointly in the DC (e.g., multi-RAT dual-connectivity, such as EN-DC, NR-DC, NE-DC, NGEN-DC) configuration. For example, in some conditions, the MN and the SN may support different release versions of 3GPP TSs (e.g., the MN may (only) support R-17 RAN functionalities and the SN may (only) support R-16 RAN functionalities). It should be noted that the impact of frequency carriers may also be included in this disclosure. For example, in some implementations, the MN/SN may operate only on NR licensed bands (e.g., to the UE, the PCell and SCells configured by the MN may operate on NR licensed bands, and the PSCell and SCells configured by the SN may operate on NR licensed bands). In some implementations, the MN/SN may operate only on NR unlicensed bands (e.g., to the UE, the PCell and SCells configured by the MN may operate on NR unlicensed bands, and the PSCell and SCells configured by the SN may operate on NR unlicensed bands). In some implementations, the MN/SN may configure a special cell (i.e., the PCell configured by the MN or the PSCell configured by the SN) and SCells on NR licensed bands and/or NR unlicensed bands. In some implementations, the PCell may operate on the licensed spectrum while one or more of the SCells may operate on the unlicensed spectrum, or the PCell may operate on the unlicensed spectrum while one or more of the SCells may operate on the licensed spectrum. In some implementations, the MN (e.g., the PCell configured by the MN) or the MCG may operate on the licensed spectrum while the SN (e.g., the PSCell configured by the SN) or the SCG may operate on the unlicensed spectrum, or the MN (e.g., the PCell configured by the MN) or the MCG may operate on the unlicensed spectrum while the SN (e.g., the PSCell configured by the SN) or the SCG may operate on the licensed spectrum.

(3) How the UE reports its capability about the L1 power saving mechanisms is still pending due to that different types of L1 power saving mechanisms may be supported in different releases of 3GPP TSs and that different BSs (e.g., NR gNB(s) and/or LTE eNB(s)) may be configured to support different releases of 3GPP TSs.

In this disclosure, solutions to the aforementioned issues are disclosed.

L1 Power Saving Mechanisms in 3GPP R-16 and R-17

1. Type 1 SSSG Switching Mechanism (Also Known as Explicit SSSG Switching Defined in R-16 of 3GPP TSs)

In some implementations, a UE may report that it supports the Type 1 SSSG switching mechanism via a UE capability transfer procedure. In the Type 1 SSSG switching mechanism, explicit switching between two Search Space (SS) groups may be triggered by a DCI (e.g., DCI format 2_0). Firstly, the UE may be configured with an RRC parameter called searchSpaceSwitchTrigger-r16. Each SearchSpaceSwitchingTrigger object carried in this RRC parameter provides the position of a bit field, in a DCI format 2_0, indicating an SSSG switching flag (or called SS switching flag) for a serving cell or, if CellGroupsForSwitching-r16 is configured, for a group of serving cells. FIG. 1 is a diagram 100 illustrating an explicit SSSG switching mechanism, according to an example implementation of the present disclosure. As illustrated in FIG. 1, the bit value zero of the SSSG switching flag may indicate the first SS group (e.g., SS group 0) to be monitored (denoted as the switching from a state 120 to a state 110), while the bit value one of the SSSG switching flag may indicate the second SS group (e.g., SS group 1) to be monitored (denoted as the switching from the state 110 to the state 120). The details of the explicit switching mechanism may be found in 3GPP TSs (e.g., 3GPP TS 38.300, TS 38.213, and TS 38.331).

2. Type 1a SSSG Switching Mechanism (Also Known as Implicit SSSG Switching Defined in R-16 of 3GPP TSs)

Figure 2:
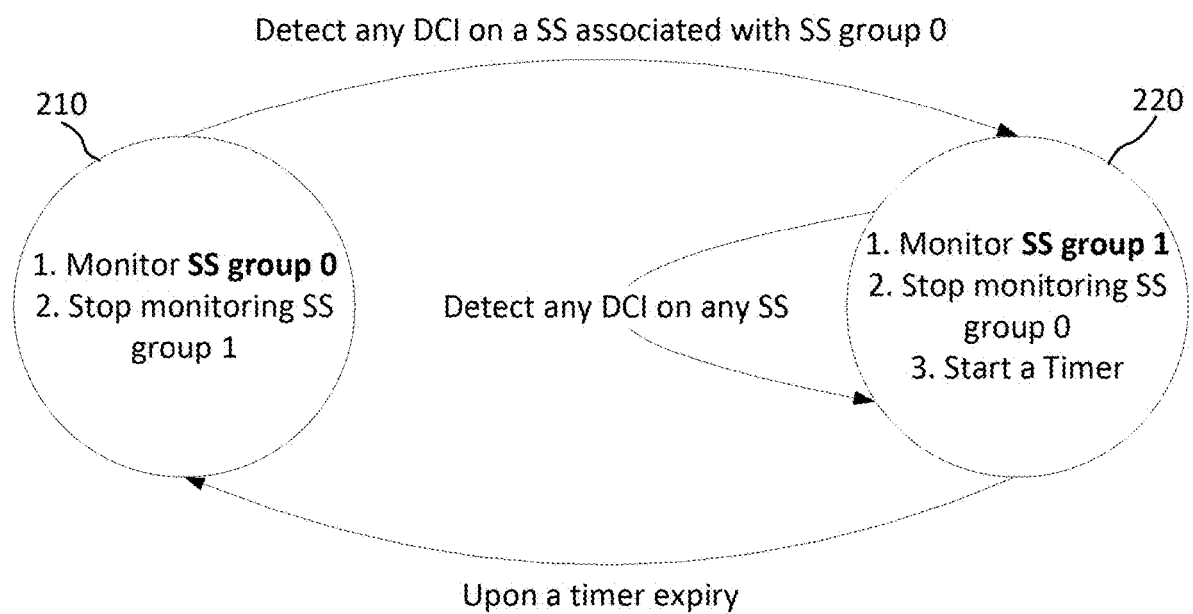
FIG. 2 is a diagram illustrating an implicit switching mechanism, according to an example implementation of the present disclosure.

The implicit SSSG switching mechanism may be implemented when the UE is not configured with the RRC parameter searchSpaceSwitchTrigger-r16. FIG. 2 is a diagram 200 illustrating an implicit SSSG switching mechanism, according to an example implementation of the present disclosure. As illustrated in FIG. 2, there may be two ways for implicit SSSG switching, one of which is implemented via a DCI (not limited to DCI format 2_0) (denoted as the switching from a state 210 to a state 220) and the other one is implemented via a timer (denoted as the switching from the state 220 to the state 210). The details of the implicit SSSG switching mechanism may be found in 3GPP TSs (e.g., 3GPP TS 38.300, TS 38.213, and TS 38.331).

3. Type 1b SSSG Switching Mechanism (Also Known as Timer-Based SSSG Switching Defined in R-16 of 3GPP TSs)

A timer (e.g., searchSpaceSwitching Timer) may be configured for the timer-based SSSG switching mechanism. For example, the UE may start or restart the timer when the UE detects a DCI format 2_0 and the SSSG switching flag is set to 1, when the UE detects any DCI on an SS associated with SS group 0, and/or when the UE detects any DCI on any SS. Upon the timer expiry, the UE may switch the SS group to SS group 0 (e.g., to monitor SS group 0 and stop monitoring SS group 1). The timer-based SSSG switching may be applied to both the explicit SSSG switching mechanism and the implicit SSSG switching mechanism as shown in FIGS. 1 and 2. The details of the timer-based SSSG switching mechanism may be found in 3GPP TSs (e.g., 3GPP TS 38.300, TS 38.213, and TS 38.331).

4. Type 2a SSSG Switching Mechanism (as Defined or to be Defined in R-17 of 3GPP TSs)

Please refer to the (L1) SSSG switching mechanism discussed in the 3GPP R-17 working items. R-17 SSSG switching mechanism may be designed based on the R-16 SSSG switching mechanisms, with one or more additional features as follows.

- At least two SSSGs may be indicated by the DCI format(s) and a timer may be supported. In addition, one of the SSSGs may be an empty/NULL/dormant SSSG (e.g., an SSSG (information element) configured without any SS/SSSG configuration) and the serving cell may instruct the UE to move to the empty/NULL/dormant SSSG.
- Explicit PDCCH skipping for a duration associated with the given timer may be supported. The duration and/or the given timer may be configured per SSSG, per BWP, per MAC entity, per cell group, and/or per cell.
- Cross-cell scheduling for L1 power saving mechanism may be supported.

2-bit indication in self-scheduling DCIs (e.g., DCI format 1_1/0_1/1_2/0_2) may be specified for triggering the PDCCH monitoring adaptation (e.g., SSSG switching and/or PDCCH skipping) in a single cell.

5. Type 2b PDCCH Skipping Mechanism (as Defined or to be Defined in R-17 of 3GPP TSs)

Figure 3:
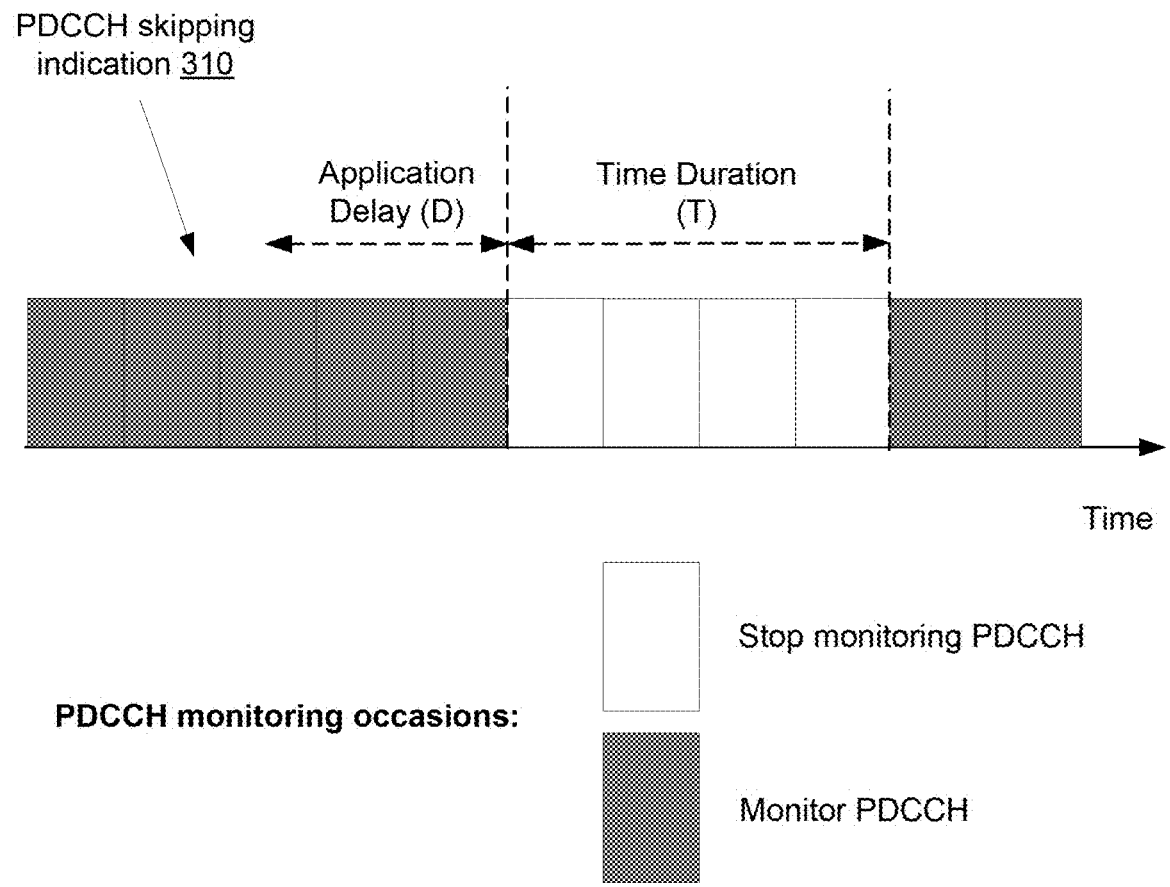
FIG. 3 is a diagram illustrating a PDCCH skipping mechanism, according to an example implementation of the present disclosure.

Please refer to the (L1) PDCCH skipping mechanism discussed in the 3GPP R-17 working items. FIG. 3 is a diagram 300 illustrating a PDCCH skipping mechanism, according to an example implementation of the present disclosure. Based on the (R-17) PDCCH skipping mechanism, a UE may receive a PDCCH skipping indication 310 (containing/carrying a specific DCI format) from the NW. The PDCCH skipping indication 310 may be used to indicate a time duration T in which the UE stops monitoring PDCCH. Upon receiving the PDCCH skipping indication 310, the UE may start to apply the PDCCH skipping indication 310 after a time period of an application delay D. After the time duration T in which the UE stops monitoring PDCCH, the UE may restart monitoring PDCCH as usual (e.g., when the UE is in the C-DRX active time). The NW may preconfigure one or more time durations for PDCCH skipping via a higher layer parameter (e.g., an RRC configuration), and the PDCCH skipping indication 310 may further indicate which one of the time durations the UE should apply.

Table 1 illustrates PDCCH configuration for the R-16/R17 L1 power saving mechanisms, which may be related to the following RRC parameters (defined in ASN.1 format), according to an example implementation of the present disclosure.

TABLE 1

| | |
|---|---|
| PDCCH-Config ::= | SEQUENCE { |
| controlResourceSetToAddModList OPTIONAL, -- Need N | SEQUENCE(SIZE (1..3)) OF ControlResourceSet |
| controlResourceSetToReleaseList OPTIONAL, -- Need N | SEQUENCE(SIZE (1..3)) OF ControlResourceSetId |
| searchSpacesToAddModList OPTIONAL, -- Need N | SEQUENCE(SIZE (1..10)) OF SearchSpace |
| searchSpacesToReleaseList OPTIONAL, -- Need N | SEQUENCE(SIZE (1..10)) OF SearchSpaceId |
| ..., [[ | |
| controlResourceSetToAddModList2-r16 OPTIONAL, -- Need N | SEQUENCE (SIZE (1..2)) OF ControlResourceSet |
| controlResourceSetToReleaseList-r16 OPTIONAL, -- Need N | SEQUENCE (SIZE (1..5)) OF ControlResourceSetId-r16 |
| searchSpacesToAddModListExt-r16 OPTIONAL, -- Need N | SEQUENCE(SIZE (1..10)) OF SearchSpaceExt-r16 |
| uplinkCancellation-r16 OPTIONAL, -- Need M | SetupRelease { UplinkCancellation-r16 } |
| monitoringCapabilityConfig-r16 { r15monitoringcapability,r16monitoringcapability } OPTIONAL, -- Need M | ENUMERATED |
| searchSpaceSwitchConfig-r16 OPTIONAL -- Need R ]] } | SearchSpaceSwitchConfig-r16 |
| SearchSpaceSwitchConfig-r16 ::= | SEQUENCE { |
| cellGroupsForSwitchList-r16 CellGroupForSwitch-r16 OPTIONAL, -- Need R | SEQUENCE(SIZE (1..4)) OF |
| searchSpaceSwitchDelay-r16 OPTIONAL -- Need R } | INTEGER (10..52) |
| CellGroupForSwitch-r16 ::= | SEQUENCE(SIZE (1..16)) OF ServCellIndex |
| cellGroupsForSwitchList indicates a list of serving cells which are bundled for the search space group switching purpose (see TS 38.213, clause 10.4). A serving cell can belong to only one CellGroupForSwitch. The network configures the same list for all BWPs of serving cells in the same CellGroupForSwitch. | |
| ServingCellConfig ::= ... | SEQUENCE { |
| WithinActiveTimeConfig-r16 ::= | SEQUENCE { |
| firstWithinActiveTimeBWP-Id-r16 OPTIONAL, -- Need M | BWP-Id |

TABLE 1-continued

```
    dormancyGroupWithinActiveTime-r16        DormancyGroupID-r16
OPTIONAL -- Need R
   }
}
OutsideActiveTimeConfig-r16 ::=          SEQUENCE {
    firstOutsideActiveTimeBWP-Id-r16         BWP-Id
OPTIONAL, -- Need M
    dormancyGroupOutsideActiveTime-r16       DormancyGroupID-r16
OPTIONAL -- Need R
}
The IE SlotFormatIndicator is used to configure monitoring a Group-Common-PDCCH for Slot-
Format-Indicators (SFI).
SlotFormatIndicator ::=      SEQUENCE {
    sfi-RNTI                     RNTI-Value,
    dci-PayloadSize              INTEGER (1..maxSFI-DCI-PayloadSize),
[...]
    searchSpaceSwitchTriggerToAddModList-r16 SEQUENCE (SIZE(1..4)) OF
SearchSpaceSwitchTrigger-r16                                OPTIONAL, -- Need N
    searchSpaceSwitchTriggerToReleaseList-r16 SEQUENCE (SIZE(1..4)) OF ServCellIndex
OPTIONAL, -- Need N
[...]
}
SearchSpaceSwitchTrigger-r16 ::=     SEQUENCE {
    servingCellId-r16                    ServCellIndex,
    positionInDCI-r16                    INTEGER(0..maxSFI-DCI-PayloadSize-1)
searchSpaceSwitchTriggerToAddModList indicates a list of SearchSpaceSwitchingTrigger
objects. Each SearchSpaceSwitchingTrigger object provides a position in DCI of the bit field
indicating SS switching flag for a serving cell or, if CellGroupsForSwitching-r16 is configured,
group of serving cells (see TS 38.213, clause 10.4).
```

The details of SSSG switching may be summarized as follows. A UE may be provided with a group index for a respective Type3-PDCCH CSS set or USS set by searchSpaceGroupIdList-r16 for PDCCH monitoring on a serving cell. If the UE is not provided with searchSpaceGroupIdList-r16 for a search space set, the following procedures may not be applicable for PDCCH monitoring according to the search space set. If a UE is provided with searchSpaceSwitchingGroupList-r16 that indicates one or more groups of serving cells, the following procedures may apply to all serving cells within each group. Otherwise, the following procedures may apply only to a serving cell for which the UE is provided with searchSpaceGroupIdList-r16. When a UE is provided with searchSpaceGroupIdList-r16, the UE may reset PDCCH monitoring according to search space sets with group index 0, if provided by searchSpaceGroupIdList-r16. A UE may be provided, by searchSpaceSwitchDelay-r16, with a number of symbols $P_{switch}$. Table 2 illustrates the minimum values of $P_{switch}$ for UE processing capability 1 and UE processing capability 2 for different SCS configuration $\mu$, according to an example implementation of the present disclosure. UE processing capability 1 for SCS configuration $\mu$ may be applied unless the UE indicates support for UE processing capability 2.

TABLE 2

| $\mu$ | Minimum $P_{switch}$ value for UE processing capability 1 (symbols) | Minimum $P_{switch}$ value for UE processing capability 2 (symbols) |
| --- | --- | --- |
| 0 | 25 | 10 |
| 1 | 25 | 12 |
| 2 | 25 | 22 |

A UE may be provided, by searchSpaceSwitchTimer-r16, with a timer value for a serving cell that the UE is provided with searchSpaceGroupIdList-r16 or, if provided, for a set of serving cells provided by cellGroupsForSwitchList-r16. The UE may decrement the timer value by one after each slot based on a reference SCS configuration that is the smallest SCS configuration $\mu$ among all configured DL BWPs in the serving cell, or in the set of serving cells. The UE may maintain the reference SCS configuration during the timer decrement procedure.

As described in clause 11.1.1 of 3GPP TS 38.213, if a UE is provided, by SearchSpaceSwitchTrigger-r16, with a location of the bit field of an SSSG switching flag for a serving cell in a DCI format 2_0, If the UE detects a DCI format 2_0 and a value of the SSSG switching flag in the DCI format 2_0 is 0, the UE may start monitoring PDCCH according to search space sets with group index 0, and stop monitoring PDCCH according to search space sets with group index 1, on the serving cell at a first slot that is at least $P_{switch}$ symbols after the last symbol of the PDCCH with the DCI format 2_0.

If the UE detects a DCI format 2_0 and a value of the search space set group switching flag field in the DCI format 2_0 is 1, the UE may start monitoring PDCCH according to search space sets with group index 1, and stop monitoring PDCCH according to search space sets with group index 0, on the serving cell at a first slot that is at least $P_{switch}$ symbols after the last symbol of the PDCCH with the DCI format 2_0, and the UE may set the timer value to the value provided by searchSpace Switch Timer-r16.

If the UE monitors PDCCH on a serving cell according to search space sets with group index 1, the UE may start monitoring PDCCH on the serving cell according to search space sets with group index 0, and stop monitoring PDCCH according to search space sets with group index 1, on the serving cell at the beginning of the first slot that is at least $P_{switch}$ symbols after a slot where the timer expires or after the last symbol of a remaining channel occupancy duration for the serving cell if indicated by DCI format 2_0.

If a UE is not provided with SearchSpace SwitchTrigger-r16 for a serving cell, if the UE detects a DCI format by monitoring PDCCH according to a search space set with group index 0, the UE may start monitoring PDCCH according to search space sets with group index 1, and stop monitoring PDCCH according to search space sets with group index 0, on the serving cell at a first slot that is at least $P_{switch}$ symbols after the last symbol of the PDCCH with the DCI format. The UE may set the timer value to the value provided by searchSpaceSwitch Timer-r16 if the UE detects a DCI format by monitoring PDCCH in any search space set.

if the UE monitors PDCCH for a serving cell according to search space sets with group index 1, the UE may start monitoring PDCCH for the serving cell according to search space sets with group index 0, and stop monitoring PDCCH according to search space sets with group index 1, on the serving cell at the beginning of the first slot that is at least $P_{switch}$ symbols after a slot where the timer expires or, if the UE is provided a search space set to monitor PDCCH for detecting a DCI format 2_0, after the last symbol of a remaining channel occupancy duration for the serving cell that is indicated by DCI format 2_0.

A UE may determine a slot and a symbol in the slot to start or stop PDCCH monitoring according to search space sets for a serving cell that the UE is provided with searchSpace-GroupIdList-r16 or, if searchSpaceSwitchingGroupList-r16 is provided, for a set of serving cells, based on the smallest SCS configuration µ among all configured DL BWPs in the serving cell or in the set of serving cells and, if any, in the serving cell where the UE receives a PDCCH and detects a corresponding DCI format 2_0 triggering the start or stop of PDCCH monitoring according to search space sets.

The details of PDCCH monitoring indication and dormancy/non-dormancy behavior for SCells may be summarized as follows. A UE configured with DRX mode operation may be provided with the following parameters for detection of a DCI format 2_6 in a PDCCH reception on the PCell or on the SpCell (by referring to TS 38.331).

ps-RNTI: a power saving-RNTI (PS-RNTI) for DCI format 2_6.

dci-Format2-6: a number of search space sets to monitor PDCCH for detection of a DCI format 2_6 on the active DL BWP of the PCell or SpCell according to a common search space as described in the 3GPP TSs (e.g., clause 10.1 of TS 38.213).

sizeDCI_2-6: a payload size for DCI format 2_6.

psPositionDCI-2-6: a location of a Wake-up indication bit in DCI format 2_6.

a '0' value for the Wake-up indication bit, when reported to higher layers, indicates to not start the drx-onDurationTimer for the next long DRX cycle (by referring to TS 38.321).

a '1' value for the Wake-up indication bit, when reported to higher layers, indicates to start the drx-onDurationTimer for the next long DRX cycle (by referring to TS 38.321).

Scell-groups-for-dormancy-outside-active-time: a bitmap, when the UE is provided a number of groups of configured SCells, where the bitmap location is immediately after the Wake-up indication bit location.

the bitmap size is equal to the number of groups of configured SCells where each bit of the bitmap corresponds to a group of configured SCells from the number of groups of configured SCells.

a '0' value for a bit of the bitmap indicates an active DL BWP, provided by dormant-BWP, for the UE for each activated SCell in the corresponding group of configured SCells (by referring to TS 38.321).

a '1' value for a bit of the bitmap indicates:

an active DL BWP, provided by first-non-dormant-BWP-ID-for-DCI-outside-active-time, for the UE for each activated SCell in the corresponding group of configured SCells, if a current active DL BWP is the dormant DL BWP, or a current active DL BWP, for the UE for each activated SCell in the corresponding group of configured SCells, if the current active DL BWP is not the dormant DL BWP.

ps-Offset: an offset indicating a time, where the UE starts monitoring PDCCH for detection of a DCI format 2_6 according to the number of search space sets, prior to a slot where the drx-onDuarationTimer would start on the PCell or SpCell (by referring to TS 38.321).

for each search space set, the PDCCH monitoring occasions are the ones in the first $T_s$ slots indicated by duration, or $T_s=1$ slot if duration is not provided, starting from the first slot of the first $T_s$ slots and ending prior to the start of drx-onDurationTimer.

On the PDCCH monitoring occasions associated with the same long DRX cycle, a UE may not expect to detect more than one DCI format 2_6 with different values of the Wake-up indication bit for the UE or with different values of the bitmap for the UE. The UE may not monitor PDCCH for detecting DCI format 2_6 during the (DRX/C-DRX) Active Time (by referring to TS 38.321). If a UE reports, for an active DL BWP, a requirement of X slots prior to the beginning of a slot where the UE would start the drx-onDurationTimer, the UE may not be required to monitor PDCCH for detection of a DCI format 2_6 during the X slots, where X corresponds to the requirement of the SCS of the active DL BWP. Table 3 illustrates the values of the minimum time gap X for different SCS, according to an example implementation of the present disclosure.

TABLE 3

| SCS (kHz) | Minimum Time Gap X (slots) | |
|---|---|---|
| | Value 1 | Value 2 |
| 15 | 1 | 3 |
| 30 | 1 | 6 |
| 60 | 1 | 12 |
| 120 | 2 | 24 |

If a UE is provided with search space sets to monitor PDCCH for detection of a DCI format 2_6 in the active DL BWP of the PCell or SpCell and the UE detects a DCI format 2_6, the physical layer of the UE may report the value of the Wake-up indication bit to higher layers (by referring to 3GPP TS 38.321) for the next long DRX cycle.

If a UE is provided with search space sets to monitor PDCCH for detection of a DCI format 2_6 in the active DL BWP of the PCell or SpCell and the UE does not detect a DCI format 2_6, the physical layer of the UE may not report the value of the Wake-up indication bit to higher layers for the next long DRX cycle.

If a UE is provided with search space sets to monitor PDCCH for detection of a DCI format 2_6 in the active DL BWP of the PCell or SpCell and the UE is not required to monitor PDCCH for detection of a DCI format 2_6 (as described in clauses 5.7, 10, 11.1, and 12 of TS 38.321) for all corresponding PDCCH monitoring occasions outside the (DRX/C-DRX) Active Time prior to a next long DRX cycle, or does not have any PDCCH monitoring occasions for detection of a DCI format 2_6 outside the (DRX/C-DRX) Active Time of a next long DRX cycle, the physical layer of the UE may report a value of 1 for the Wake-up indication bit to higher layers for the next long DRX cycle.

If a UE is provided with search space sets to monitor PDCCH for detection of a DCI format 0_1 and a DCI format 1_1 and if one or both of the DCI format 0_1 and the DCI format 1_1 include(s) an SCell dormancy indication field, the SCell dormancy indication field is a bitmap with a size equal to the number of groups of configured SCells, provided by Scell-groups-for-dormancy-within-active-time.

each bit of the bitmap corresponds to a group of configured SCells from the number of groups of configured Scells.

if the UE detects a DCI format 0_1 or a DCI format 1_1 that does not include a carrier indicator field, or detects a DCI format 0_1 or a DCI format 1_1 that includes a carrier indicator field with value equal to 0.

a '0' value for a bit of the bitmap indicates an active DL BWP, provided by dormant-BWP, for the UE for each activated SCell in the corresponding group of configured SCells.

a '1' value for a bit of the bitmap indicates:
  an active DL BWP, provided by first-non-dormant-BWP-ID-for-DCI-inside-active-time, for the UE for each activated SCell in the corresponding group of configured SCells, if a current active DL BWP is the dormant DL BWP, or
  a current active DL BWP, for the UE for each activated SCell in the corresponding group of configured SCells, if the current active DL BWP is not the dormant DL BWP.

the UE may set the active DL BWP to the indicated active DL BWP.

If a UE is provided with search space sets to monitor PDCCH for detection of a DCI format 1_1, and if the CRC of the DCI format 1_1 is scrambled by a C-RNTI or a MCS-C-RNTI, and if a one-shot HARQ-ACK request field is not present or has a '0' value, and if the UE detects a DCI format 1_1 on the primary cell that does not include a carrier indicator field, or detects a DCI format 1_1 on the primary cell that includes a carrier indicator field with value equal to 0, and if resource Allocation=resource AllocationType0 and all bits of the frequency domain resource assignment field in the DCI format 1_1 are equal to 0, or resource Allocation=resource AllocationType1 and all bits of the frequency domain resource assignment field in the DCI format 1_1 are equal to 1, or resource Allocation dynamicSwitch and all bits of the frequency domain resource assignment field in the DCI format 1_1 are equal to 0 or 1, the UE may consider that the DCI format 1_1 indicates SCell dormancy, indicates not scheduling a PDSCH reception, or indicating a SPS PDSCH release, and for transport block 1, the UE may interpret the sequence of fields of:
  modulation and coding scheme,
  new data indicator,
  redundancy version,
and of:
  HARQ process number,
  antenna port(s), and
  DMRS sequence initialization,
as providing a bitmap to each configured SCell, in an ascending order of the SCell index, where:
  a '0' value for a bit of the bitmap indicates an active DL BWP, provided by dormant-BWP, for the UE for a corresponding activated SCell.
  a '1' value for a bit of the bitmap indicates:
    an active DL BWP, provided by first-non-dormant-BWP-ID-for-DCI-inside-active-time, for the UE for a corresponding activated SCell, if a current active DL BWP is the dormant DL BWP, or
    a current active DL BWP, for the UE for a corresponding activated SCell, if the current active DL BWP is not the dormant DL BWP.
  the UE may set the active DL BWP to the indicated active DL BWP.

If an active DL BWP provided by dormant-BWP for a UE on an activated SCell is not a default DL BWP for the UE on the activated SCell (as described in clause 12 of TS 38.213), the BWP inactivity timer may not be used for transitioning from the active DL BWP provided by dormant-BWP to the default DL BWP on the activated SCell.

A UE may be expected to provide HARQ-ACK information in response to the detection of a DCI format 1_1 indicating SCell dormancy after N symbols from the last symbol of a PDCCH providing the DCI format 1_1. If processing Type2Enabled of PDSCH-ServingCellConfig is set to enable for the serving cell with the PDCCH providing the DCI format 1_1, N=5 for $\mu=0$, N=5.5 for $\mu=1$, and N=11 for $\mu=2$; otherwise, N=10 for $\mu=0$, N=12 for $\mu=1$, N=22 for $\mu=2$, and N=25 for $\mu=3$, where $\mu$ is the smallest SCS configuration between the SCS configuration of the PDCCH providing the DCI format 1_1 and the SCS configuration of a PUCCH with the HARQ-ACK information in response to the detection of the DCI format 1_1.

The details of DCI format 2_6, DCI format 0_1, and DCI format 1_1 may be summarized as follows. A DCI format 2_6 may be used for notifying the power saving information outside the DRX Active Time for one or more UEs. The following information may be transmitted by means of the DCI format 2_6 with a CRC scrambled by a PS-RNTI:
  block number 1, block number 2, . . . , block number N, where the starting position of a block is determined by the parameter ps-PositionDCI-2-6 provided by higher layers for the UE configured with the block.

If the UE is configured with higher layer parameter PS-RNTI and dci-Format2-6, one block may be configured for the UE by higher layers, with the following fields defined for the block:
  Wake-up indication: 1 bit, and
  Dormancy indication: 0 bit if a higher-layer parameter Scell-groups-for-dormancy-outside-active-time is not configured; otherwise 1, 2, 3, 4 or 5 bits bitmap determined according to the higher-layer parameter Scell-groups-for-dormancy-outside-active-time, where each bit corresponds to one of the SCell group(s) configured by the higher-layer parameter Scell-groups-for-dormancy-outside-active-time, with the most significant bit (MSB) to the least significant bit (LSB) of the bitmap corresponding to the first to last configured SCell group.

The size of a DCI format 2_6 is indicated by the higher-layer parameter sizeDCI-2-6, according to clause 10.3 of TS 38.213.

A DCI format 0_1 may be used for the scheduling of one or multiple PUSCH resources in one cell, or for indicating CG downlink feedback information (CG-DFI) to a UE.

A DCI format 1_1 may be used for the scheduling of PDSCH in one cell.

In some implementations, the application delay for PDCCH monitoring adaptation (e.g., SSSG switching or PDCCH skipping) may be different per UE. In some implementations, the application delay for PDCCH monitoring adaptation may also be configurable (by the serving RAN to the UE) as part of the configuration of the PDCCH monitoring adaptation mechanisms. Thus, it is possible that different UEs/RANs may apply different application delays. The following options of application delay for PDCCH monitoring adaptation may be considered.

(a) The application timelines defined in 3GPP TS (e.g., Table 10.4-1 in TS 38.213) for SSSG switching for unlicensed band may be reused.
(b) The application delay for PDCCH processing may reuse or extend from the R-16 minimum application delay for K0min/K2min indication.
(c) The PDCCH skipping command may be applied after PUSCH transmission, if triggered by UL DCI.
(d) The PDCCH skipping command may be applied after ACK/NACK transmission.
(e) The PDCCH skipping command may be applied after successfully decoding a TB.
(f) The application delay may be "ZERO" for PDCCH monitoring adaptation. PDCCH monitoring adaptation may be applied after the UE receives additional control signalling bit(s) for PDCCH monitoring adaptation in a DCI.
(g) The application delay(s) may be configured by the serving RAN via RRC signalling.

In some implementations, the reference point for the application time may be determined according to the DL timing associated with the serving RAN or according to the GNSS.

In some implementations, the SSSG switching mechanism and the PDCCH skipping mechanism may apply or may be configured with the same application delay. In some implementations, the SSSG switching mechanism and the PDCCH skipping mechanism may apply or may be configured with different application delays.

In some implementations, the application delay for PDCCH monitoring adaptation indicated by a DCI may be the same as the application delay for PDCCH monitoring adaptation indicated by a timer expiration. In some implementations, the application delay for PDCCH monitoring adaptation indicated by a DCI may be different from the application delay for PDCCH monitoring adaptation indicated by a timer expiration.

Figure 4:
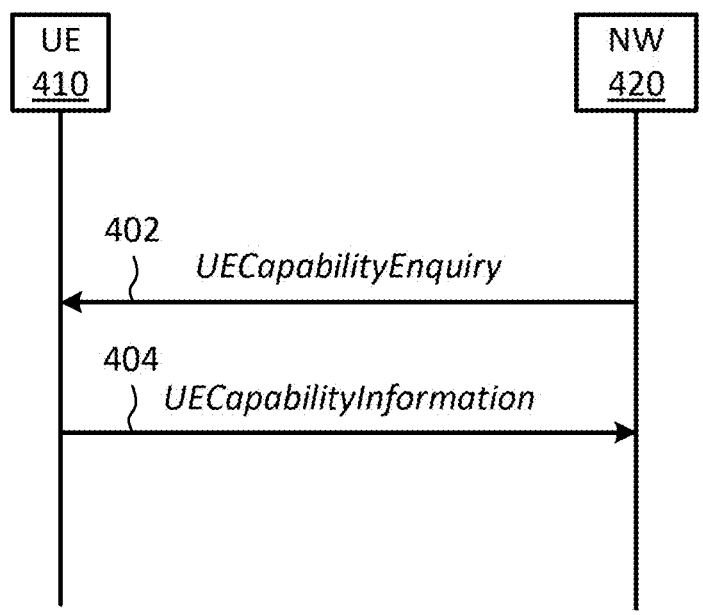
FIG. 4 is a diagram illustrating a UE capability transfer procedure, according to another example implementation of the present disclosure.

FIG. 4 is a diagram 400 illustrating a UE capability transfer procedure, according to an example implementation of the present disclosure. In action 402, a UE 410 may receive a UECapabilityEnquiry message from a NW 420. In action 404, the UE 410 may transmit a UECapabilityInformation message to the NW 420.

The NW may initiate the UE capability transfer procedure with a UE when the NW needs (additional) information of the UE's radio access capabilities. The NW may request which UE capability information that the UE needs to report based on band information. The UE may transfer its UE capability information upon receiving the UECapabilityEnquiry message from the NW. The NW may retrieve the UE capability information after completion of the AS security activation. The NW may not forward, to the CN, the UE capability information that were retrieved before completion of the AS security activation.

The UE may report information of its radio access capabilities which are static at least when the NW requests. The UE capability information may be represented by a capability ID, which may be exchanged in NAS signaling over the air and exchanged in core network signaling instead of the UE capability structure in the AS layer.

Upon reception of the UECapabilityEnquiry message, the UE may set the contents of the UECapabilityInformation message. In some implementations, the UECapabilityInformation message may be generated in the RRC layer and the UE may submit/transmit/send the UECapabilityInformation message to lower layers for transmission (to the NW).

UE Capability Presentation for L1 Power Saving Mechanisms in R-16

In some implementations, the UE may report that it supports an R-16 L1 power saving mechanism via the UECapabilityInformation message to the serving cell (e.g., via SRB1). In some implementations, the UE may indicate whether it supports an R-16 L1 power saving mechanism in the IE 'SharedSpectrumChAccessParamsPerBand'. The IE 'SharedSpectrumChAccessParamsPerBand' is used to convey parameters related to shared channel access for a certain frequency band (e.g., not per feature set or per band combination). The IE 'SharedSpectrumChAccessParamsPerBand' may be further associated with another IE 'FreqBandIndicatorNR' which indicates one NR frequency band.

In some implementations, the R-16 L1 power saving mechanism may be referred to as PDCCH monitoring adaptation within an active BWP/cell/frequency carrier. In some implementations, the R-16 L1 power saving mechanism may be referred to as SSSG switching and/or PDCCH skipping within an active BWP/cell/frequency carrier.

In the IE 'SharedSpectrumChAccessParamsPerBand', the UE may further include the following IEs to report its radio access capability corresponding to the concerned NR frequency band.

(a) searchSpaceSwitchWithDCI-r16 ENUMERATED {supported} OPTIONAL. This IE indicates whether the UE supports SSSG switching with explicit DCI 2_0 bit-field trigger or with implicit PDCCH decoding with DCI 2_0 monitoring.
(b) searchSpaceSwitchWithoutDCI-r16 ENUMERATED {supported} OPTIONAL. This IE indicates whether the UE supports SSSG switching with implicit PDCCH decoding without DCI 2_0 monitoring.
(c) searchSpaceSwitchCapability2-r16 ENUMERATED {supported} OPTIONAL. This IE indicates whether the UE supports SSSG switching capability 2.
(d) extendedSearchSpaceSwitchWithDCI-r16 ENUMERATED {supported}OPTIONAL. This IE indicates whether the UE supports SSSG switching triggers to be individually configured for up to 16 cells. The UE indicating support of this feature should also indicate support of searchSpace SwitchWithDCI-r16.

In some implementations, the UE capability originally designed for NR-unlicensed (NR-U) operation may also be applicable to NR licensed band operation. Therefore, in R-17, the UE may report the L1 power saving mechanism that it supports (e.g., via the same R-16 IEs) with one or more associated NR licensed bands.

In some implementations, the UE may reuse all or part of the same IEs (e.g., searchSpaceSwitchWithDCI, searchSpaceSwitchWithoutDCI, searchSpaceSwitchCapability2, and extendedSearchSpaceSwitchWithDCI) in R-17 of 3GPP TSs directly. However, it should be noted that the same IEs may be associated with the R-17 L1 power saving mechanisms, rather than the R-16 L1 power saving mechanisms (e.g., different DCI formats may be configured to be associated with R-16 and R-17 L1 power saving mechanisms).

UE Capability Presentation for L1 Power Saving Mechanism in R-17

In some implementations, a UE may report its UE capability about whether it supports the R-17 L1 power saving mechanisms. In some implementations, the UE may further report whether it supports one or more specific R-17 L1 power saving mechanisms, e.g., whether the UE supports:
  (a) SSSG switching to empty/null/dormant SSSG (e.g., one IE searchSpaceSwitch-r17=true may be configured to indicate that the UE supports SSSG switching to empty/null SSSG), or
  (b) PDCCH skipping (e.g., one IE searchSpaceSkipping-r17=true may be configured to indicate that the UE supports SSSG skipping), or
  (c) SSSG switching to empty/null/dormant SSSG and PDCCH skipping jointly (e.g., one IE PDCCHPowerSaving-r17=true may be configured to indicate that the UE supports both SSSG switching (to empty/null/dormant SSSG) and PDCCH skipping)

In some implementations, the UE capability for R-17 L1 power saving mechanisms may be applicable to both (NR) unlicensed bands and (NR) licensed band (e.g., one common IE about UE capability may be applicable to both licensed bands and unlicensed bands). In some implementations, the UE capability for R-17 L1 power saving mechanisms may be limited to (NR) licensed bands only, and accordingly, the UE may need to further indicate its capability about R-16/R-17 L1 power saving mechanisms on (NR) unlicensed bands to the NW. In some implementations, the UE may further indicate its capability about R-17 L1 power saving mechanisms for (NR) licensed bands and unlicensed bands, respectively (with or without the UE capability for R-16 L1 power saving mechanisms). For example, two IEs may be configured by the UE, in which one IE is presented to indicate the UE's capability about R-17 L1 power saving mechanisms on licensed bands and another IE is presented to indicate the UE's capability about R-17 L1 power saving mechanisms on unlicensed bands.

Considerations related to UE capability for each L1 power saving mechanism are further described as follows. In some implementations, the UE may indicate its UE capability about each of the R-17 L1 power saving mechanisms, respectively. In some implementations, the UE may indicate its UE capability about whether it supports the R-17 PDCCH/SSSG switching mechanism (e.g., the Type 2a SSSG switching mechanism). In some implementations, the UE may indicate its UE capability about whether it supports the R-17 PDCCH/SSSG skipping mechanism (e.g., the Type 2b SSSG skipping mechanism). In some implementations, the UE may indicate only one IE to report that it supports all of the R-17 L1 power saving mechanisms (which include the R-17 PDCCH/SSSG skipping mechanism and the R-17 PDCCH/SSSG switching mechanism).

Considerations related to granularity issue for L1 power saving mechanisms are further described as follows. In some implementations, the UE capability about whether the UE supports one or more R-17 L1 power saving mechanisms may be reported with one associated (NR) frequency band (e.g., different (NR) frequency bands supported by the UE may be associated with different R-17 L1 power saving mechanisms). In some implementations, the UE capability about whether the UE supports one or more R-17 L1 power saving mechanisms may be reported per feature set. In some implementations, the UE capability about whether the UE supports one or more R-17 L1 power saving mechanisms may be reported per band or per band combination. In some implementations, the UE capability about whether the UE supports one or more R-17 L1 power saving mechanisms may be reported per UE.

Considerations related to Co-existence issue for UE capability reporting are further described as follows. In some implementations, the UE may report the UE capability about R-16 L1 power saving mechanisms and R-17 L1 power saving mechanisms separately in one or more times of UEcapabilityinformation reporting (associated with the same (NR) frequency band, the same band combination, the same feature set, or the same UE). After receiving the UE capability about the R-16 and R-17 L1 power saving mechanisms, the NW may configure the R-16 and/or R-17 L1 power saving mechanisms, based on the types of frequency bands (e.g., NR unlicensed bands or licensed bands), to the UE (e.g., via UE-specific control signaling) and in the serving RAN for the concerned frequency carriers associated with the UE. In some implementations, the UE capability about the R-17 L1 power saving mechanisms may also include the UE capability about R-16 L1 power saving mechanisms. That is, if the UE indicates that the R-17 L1 power saving mechanism(s) is or are supported in one (NR) frequency band (or in one band combination, one feature set, or one UE), it may (implicitly) mean that the UE also supports the R-16 L1 power saving mechanism(s), and it may not need to indicate the UE capability about the R-16 L1 power saving mechanism(s) for the concerned (NR) frequency band. In some implementations, for one (NR) frequency band (e.g., one (NR) unlicensed band), the UE may transmit both the UE capabilities about R-16 and R-17 L1 power saving mechanisms (respectively) to the serving cell. That is, it may be possible that the UE can support both R-16 and R-17 L1 power saving mechanisms on the same NR frequency carrier. In such cases, it may be network implementations to configure either the R-16 or R-17 L1 power saving mechanism(s) to the UE. It should be noted that, for one specific (NR) frequency band, the RAN may configure only one type of L1 power saving mechanism(s) at one time. In other words, the NW may not configure both the R-16 and R-17 L1 power saving mechanisms jointly for one specific (NR) frequency band or frequency carrier. In some implementations, the serving RAN may configure an R-16 L1 power saving mechanism on one (NR) frequency band if the UE supports the R-17 L1 power saving mechanisms on the (NR) frequency band. In other words, the R-16 L1 power saving mechanisms may be considered as a subset of the R-17 L1 power saving mechanisms. For example, the UE may transmit its capability about the R-17 L1 power saving mechanism(s) to the serving RAN, and in response to the transmission of the UE capability, the UE may receive configuration of an R-16 L1 power saving mechanism from the serving RAN. In some implementations, the design of the R-16 L1 power saving mechanism being considered as a subset of the R-17 L1 power saving mechanism may be applicable only to (NR) unlicensed bands. In some implementations, such design may be applicable to both (NR) licensed bands and unlicensed bands.

In some implementations, the UE may report its capability about L1 power saving mechanisms based on whether the UE supports the following behaviors.

Beh 1: PDCCH skipping not activated, which means that the UE does not support PDCCH skipping.

Beh 1A: PDCCH skipping, which means that the UE may stop PDCCH monitoring for a time duration, and report a value of the time duration in the UECapabilityInformation message.

Beh 2: SSSG switching to SSSG #0, which means that the UE may stop monitoring search space sets associated with SSSG #1 and SSSG #2 and switch to monitor search space sets associated with SSSG #0.

Beh 2A: SSSG switching SSSG #1, which means that the UE may stop monitoring search space sets associated with SSSG #0 and SSSG #2 and switch to monitor search space sets associated with SSSG #1.

Beh 2B: SSSG switching to SSSG #2, which means that the UE may stop monitoring search space sets associated with SSSG #0 and SSSG #1 and switch to monitor search space sets associated with SSSG #2.

In some implementations, the UE may be configured with one of the following options for R-17 Layer-1 power saving mechanisms:

Option #1—The UE is configured with one IE PDCCHSkippingDurationList and the UE is not configured with an IE searchSpaceGroupIdList. In this option, the serving RAN may use one bit in a DCI to further control the PDCCH skipping duration (based on the IE PDCCHSkippingDurationList configured to the UE) which the UE may apply accordingly.

Option #2—The UE is configured with one IE searchSpaceGroupIdList and the UE is not configured with an IE PDCCHSkippingDurationList. In this option, the serving RAN may use one bit in a DCI to further control the SSSG ID (based on the IE searchSpaceGroupIdList configured to the UE) which the UE may apply accordingly. Moreover, the serving RAN may also use another one bit in the DCI to further control the PDCCH skipping duration (based on the IE PDCCHSkippingDurationList configured to the UE) which the UE may apply accordingly.

Option #3—The UE is configured with both an IE searchSpaceGroupIdList and an IE PDCCHSkippingDurationList. In this option, the serving RAN may use one bit in a DCI to further control the SSSG ID (based on the IE searchSpaceGroupIdList configured to the UE) which the UE may apply accordingly.

In other words, it also means that the UE may decode and interpret the received DCIs based on the configurations (e.g., option #1, option #2, or option #3) received by the UE from the serving RAN. The serving RAN may configure option #1, option #2, or option #3 based on the UE capability about PDCCH skipping and/or SSSG switching, which is transmitted to the serving RAN via the UE capability transfer procedure.

Considerations related to RAN operation for UE capability reporting are further described as follows. In some implementations, the serving BS or serving node, such as gNB or eNB, may forward the UEcapabilityinformation received from the UE to another network node under different circumstances as follows.

In a (conditional or Dual Active Protocol Stack (DAPS)) handover procedure, the source BS (e.g., a source cell) may forward the UE capability about the R-16/R-17 L1 power saving mechanisms to the target BS (e.g., a target cell or a candidate of multiple target cells). It should be noted that the handover procedure may include intra-RAT/inter-RAT/inter-system handover procedure.

In a multi-RAT DC scenario, the MN (of the master cell group) may forward the UE capability about R-16/R-17 L1 power saving mechanisms to the SN (of a secondary cell group).

From the perspective of the backhaul connection, the UE capability about the R-16/R-17 L1 power saving mechanisms may be transmitted between network nodes (e.g., between BSs or between the RAN and CN) via a wired or wireless backhaul connection, such as the X2 interface, the Xn interface, or an integrated access and backhaul (IAB) connection.

Considerations related to UE Assistance Information Reporting are further described as follows. In some implementations, the UE may report its capability about the R-16/R-17 L1 power saving mechanisms via the UEAssistanceInformation message under different circumstances as follows.

In a DC scenario (e.g., Multi-RAT DC, E-UTRA-NR DC, NR-E-UTRA DC, Next Generation Core-ENDC), the UE may report its capability about the R-16/R-17 L1 power saving mechanisms to the SN via the SRB3 between the UE and the SN.

In a (conditional/DAPS) handover procedure, the source BS or the source RAN may forward the UE capability information, e.g., via the handoverpreparationinformation message, to the target BS, the target RAN, or the control unit (CU) of the distributed unit (DU) when CU-DU split is applied in the serving RAN. In some implementations, the UE capability information may be exchanged between BSs in an NR-RAN only. In other words, the UE capability information may not be transmitted to the target BS if the target BS is not in an NR-RAN or the target RAN is not an NR-RAN. In some conditions, the target BS or the target RAN may belong to or may be an E-UTRAN or an NB-IoT network.

Considerations related to UE capability of search space switch delay are further described as follows. In some implementations, a UE may be provided, by searchSpaceSwitchDelay, with a number of symbols Pswitch where a minimum value of Pswitch is provided in Table 2 for UE processing capability 1 and UE processing capability 2 and SCS configuration u.

In some implementations, the serving RAN may determine the search space switch delay of the R-17 L1 power saving mechanism(s) also by referring to the searchSpaceSwitchDelay provided by the UE. In some implementations, one additional UE capability (e.g., UE processing capability 3 and SCS configuration u-R17) associated with the R-17 L1 power saving mechanisms may also be reported by the UE via the UECapabilityReport message. That is, the serving RAN may configure the searchSpaceSwitchDelay-R17 for the R-17 L1 power saving mechanism(s) (e.g., based on the UE processing capability 3 and SCS configuration u-R17 reported by the UE). In addition, the UE may be configured with different searchSpaceSwitchDelay values for the R-16 L1 power saving mechanism(s) and the R-17 L1 power saving mechanism(s), respectively. In some implementations, one common searchSpaceSwitchDelay value may be configured to the UE for both the R-16 L1 power saving mechanism(s) and the R-17 L1 power saving mechanism(s).

Considerations related to ASN.1 format design are further described as follows. In some implementations, the 3GPP TS may define (only) one L1 power saving mechanism for the concerned frequency carrier or frequency band(s), or for one type of the frequency bands (e.g., NR/E-UTRA licensed bands or unlicensed bands), or for a UE. In the ASN.1 architecture, the RAN may configure a L1 power saving mechanism, e.g., in the UE-specific RRC signaling, as follows.

CHOICE {
R-16 Layer-1 power saving mechanism;
R-17 Layer-1 power saving mechanism
};

In some implementations, the types of R-16/R-17 L1 power saving mechanisms may be configured in the ASN.1 architecture as follows.

CHOICE {
R-16 Layer-1 power saving mechanism;
  CHOICE {Types of R-16 L1 power saving mechanism};
R-17 Layer-1 power saving mechanism;
  CHOICE {Types of R-17 L1 power saving mechanism};
};

It should be noted that, based on the configured L1 power saving mechanism on the concerned frequency carrier or BWP, the UE may also be configured to decode the DCI(s) on the concerned frequency carrier based on the configured L1 power saving mechanism on the associated serving cell, the associated serving frequency carrier, the configured cell group, or the associated MAC entity.

RAN Operation for L1 Power Saving Mechanism

Considerations related to RAN configuration are further described as follows. In some implementations, the UE may be configured with R-16 L1 power saving mechanisms (e.g., by a Type 1/Type 1a/Type 1b SSSG switching configuration) from the serving node (e.g., via the RR (Reconfiguration message). In some implementations, the UE may be configured with R-17 L1 power saving mechanisms (e.g., by a Type 2a/Type 2b power saving configuration) from the serving node (e.g., via the RR ('Reconfiguration message). In some implementations, the serving node may be a MN or a master BS (e.g., via SRB1). In some implementations, the serving node may be a SN or a secondary BS (e.g., via SRB3).

Considerations related to handover procedure are further described as follows. In some implementations, the UE may only be configured with one of the L1 power saving mechanisms during the DAPS handover procedure.

In some implementations, during the conditional handover procedure, the UE may be configured with the L1 power saving mechanism(s) in the RR (Reconfiguration message which includes the conditional reconfiguration IE to instruct the UE to implement the conditional handover procedure.

In some implementations, the UE's configuration of the R-16/R-17 L1 power saving mechanism(s) may be kept as a part of the UE (Inactive AS) context. In some implementations, the UE's configuration of the R-16/R-17 L1 power saving mechanism(s) may be delivered from the source cell to the target cell during the handover preparation procedure. In some implementations, the target cell may also configure the R-16/R-17 L1 power saving mechanism(s) to the UE by transmitting the handover command message (e.g., to the source cell). For example, the handover command message may include an indicator to indicate whether the target cell applies/supports the R-16/R-17 L1 power saving mechanism(s) which is or are the same as that included in the handover preparation message received from the source cell. Alternatively, the handover command message may include the configuration of the R-16/R-17 L1 power saving mechanism(s) supported by the target cell, which is at least covered by the UE's configuration of the R-16/R-17 L1 power saving mechanism(s). In some implementations, the source cell (e.g., configured by a BS which supports 3GPP R-17 functionalities) may configure the R-17 L1 power saving mechanism(s) to the UE and then the target cell (e.g., configured by a BS which supports 3GPP R-16 functionalities) may configure the R-16 L1 power saving mechanism(s) to the UE. In some implementations, the source cell (e.g., configured by a BS which supports 3GPP R-16 functionalities) may configure the R-16 L1 power saving mechanism(s) to the UE and then the target cell (e.g., configured by a BS which supports 3GPP R-17 functionalities) may configure the R-17 L1 power saving mechanism(s) to the UE.

In some implementations, the UE may release the stored configuration of the R-16/R-17 L1 power saving mechanisms after receiving a full-configuration instruction from the serving RAN (e.g., the UE may receive the full-configuration instruction associated with one (candidate) target cell during the handover procedure).

In some implementations, the UE may release the stored configuration of the R-16/R-17 L1 power saving mechanisms (e.g., associated with the source cell/BS) after the UE receives the RRC reconfiguration message from the source cell, and/or after the UE completes the RA procedure (successfully) with the target cell.

In some implementations, the UE may replace the stored configuration of the R-16/R-17 L1 power saving mechanisms (e.g., associated with the source cell/BS) with the received configuration of the R-16/R-17 L1 power saving mechanisms in the RRC reconfiguration message after the UE receives the RRC reconfiguration message from the source cell, and/or after the UE completes the RA procedure (successfully) with the target cell.

Considerations related to reconfiguration, modification, or change of the L1 power saving mechanisms are further described as follows. In some implementations, the serving RAN may change or modify the UE's L1 power saving mechanism by updating (all or part of) related IEs or configurations to the UE. For example, the serving RAN may change the UE's searchSpaceGroupId (associated with one DL-BWP) from {0,1} (which is supported in R-16 Layer-1 power saving mechanism) to {0, 1, 2} (which is supported in R-17 Layer-1 power saving mechanism), or vice versa, and indicate the UE to change its associated L1 power saving mechanism (based on the instruction received from the serving RAN). In some implementations, the UE may (automatically or by default) support the R-16 L1 power saving mechanisms if the UE supports the R-17 L1 power saving mechanisms.

Considerations related to granularity issue are further described as follows. In some implementations, a per-UE granularity for the L1 power saving mechanisms is proposed, where one UE (e.g., a UE which is configured with multi-RAT DC or CA) may be configured with only one type of L1 power saving mechanisms. For example, different cell groups (e.g., MCG and/or SCG) may not be allowed (or may be restricted) to be configured with different L1 power saving mechanisms.

In some implementations, a per-MAC-entity granularity for the L1 power saving mechanisms is proposed, where one MAC entity (e.g., a MAC entity associated with the MCG/MN or associated with the SCG/SN) may be configured with only one type of L1 power saving mechanisms. For example, all of the serving cells (e.g., primary cell, primary secondary cell, and/or secondary cell) associated with the same MAC entity may be configured with the same L1 power saving mechanisms, or the serving cells associated with the same MAC entity may not be configured with different types of L1 power saving mechanisms. In some implementations, different MAC entities (or different cell groups, such as MCG and/or SCG) may be configured with different L1 power saving mechanisms, respectively (e.g., the MCG/MN may support type 1 SSSG switching mechanism, while the SCG/SN may support the type 2a SSSG switching mechanism).

In some implementations, a per-cell granularity for the L1 power saving mechanisms is proposed, where one serving cell (e.g., a primary cell, a primary secondary cell, or a secondary cell associated with the MCG/MN or the SCG/SN) may be configured with only one type of L1 power saving mechanisms. For example, all of the DL BWPs configured on the same serving cell may be configured with the same L1 power saving mechanisms, or the DL BWPs configured on the same serving cell may not be configured with different types of L1 power saving mechanisms. In some implementations, different serving cells associated with one MAC entity may be configured with different types of L1 power saving mechanisms.

In some implementations, a per-BWP granularity for the L1 power saving mechanisms is proposed, where one DL BWP (e.g., a DL BWP configured on the primary cell, the primary secondary cell, or the secondary cell associated with the MCG/MN or the SCG/SN) may be configured with only one type of L1 power saving mechanisms. For example, all of the search space sets (or SSSGs) of the same DL BWP may be configured with the same L1 power saving mechanisms, or the search space sets (or SSSGs) of the same DL BWP may not be configured with different types of L1 power saving mechanisms. In some additional implementations, all of the search space (or search space set group) configured with the same serving cell may not be configured with different types of L1 power saving mechanisms.

In some additional implementations, in one MAC entity, different serving cells may be configured with different types of L1 power saving mechanisms. In some implementations, different search space sets of the same DL BWP may be configured with different types of L1 power saving mechanisms. In some implementations, different L1 power saving mechanisms may be configured jointly on one BWP. For example, some SSSGs within one DL BWP may be associated with the R-16 L1 power saving mechanism, while some other SSSGs within the same DL-BWP may be associated with the R-17 L1 power saving mechanism.

In some implementations, the UE may be configured with one or more groups of serving cells (e.g., by cellGroupForSwitch) which are bundled for the SSSG switching purpose. In some implementations, one UE may be configured with one or more groups of serving cells (e.g., by cellGroupForSwitch_R16) associated with the R-16 L1 power saving mechanism. It should be noted that the serving cells bundled by cellGroupForSwitch_R16 may be managed/supported by the same BS (e.g., an MN or SN, which supports 3GPP R-16 functionalities). The UE may receive the cell group configuration cellGroupForSwitch_R16 from the control signaling transmitted by the MN (e.g., via SRB1) or SN (e.g., via SRB3).

In some implementations, the UE may also be configured with one or more groups of serving cells (e.g., by cellGroupForSwitch_R17) associated with the R-17 L1 power saving mechanism. It should be noted that the serving cells bundled by cellGroupForSwitch_R17 may be managed/supported by the same BS (e.g., an MN or SN, which supports 3GPP R-17 functionalities). The UE may receive the cell group configuration cellGroupForSwitch_R17 from the control signaling transmitted by the MN (e.g., via SRB1) or SN (e.g., via SRB3). In some implementations, the serving cells bundled by the cell group configuration cellGroupForSwitch_R17 may be managed/supported by different BSs.

It should be noted that, one UE may be configured with the cell group(s) by cellGroupForSwitch_R16 and/or the cell group(s) by cellGroupForSwitch_R17, but one serving cell may be associated with only one cell group.

DCI Indication for L1 Power Saving Mechanism

In some implementations, the UE may be configured to decode the DCI including an indication for L1 power saving mechanism. For example, the bit mapping of the DCI indication for PDCCH monitoring adaptation may be defined as follows.

Case 1: PDCCH skipping
  A 1-bit field in a scheduling DCI may be supported to indicate the UE behavior for PDCCH monitoring adaptation (e.g., if M=1) In some implementations, M is the number of PDCCH skipping durations configured in the IE PDCCHSkippingDuration.
    This 1-bit field with a value '0' may indicate Beh 1, or with a value '1' may indicate Beh 1A.
  A 2-bit field in a scheduling DCI may be supported to indicate the UE behavior for PDCCH monitoring adaptation (e.g., if M=2 or 3).
    This 2-bit field with a value '00' may indicate Beh 1.
    This 2-bit field with a value '01' may indicate Beh 1A with skipping duration 1.
    This 2-bit field with a value '10' may indicate Beh 1A with skipping duration 2.
    This 2-bit field with a value '11' may indicate Beh 1A with skipping duration 3 if M=3, or reserved if M=2.

Case 2: 2 SSSGs switching
  A 1-bit field in a scheduling DCI may be supported to indicate the UE behavior for PDCCH monitoring adaptation.
    This 1-bit field with a value '0' may indicate Beh 2, or with a value '1' may indicate Beh 2A.

Case 3: 3 SSSGs switching
  A 2-bit field in a scheduling DCI may be supported to indicate the UE behavior for PDCCH monitoring adaptation.
    This 2-bit field with a value '00' may indicate Beh 2.
    This 2-bit field with a value '01' may indicate Beh 2A.
    This 2-bit field with a value '10' may indicate Beh 2B.
    The value '11' is reserved.

Case 4: 2 SSSGs switching with PDCCH skipping
  A 2-bit field in a scheduling DCI may be supported to indicate the UE behavior for PDCCH monitoring adaptation.

Case 5: 3 SSSGs switching with PDCCH skipping
  A 2-bit field in a scheduling DCI may be supported to indicate the UE behavior for PDCCH monitoring adaptation.
    This 2-bit field with a value '00' may indicate Beh 2.
    This 2-bit field with a value '01' may indicate Beh 2A.
    This 2-bit field with a value '10' may indicate Beh 2B.
    This 2-bit field with a value '11' may indicate Beh 1A.

In some implementations, the serving RAN may configure the UE to implement different UE behaviors (e.g., as described above in Cases 1 to 5) based on the proposed granularity, e.g., per UE, per MAC entity, per cell group, per cell, per frequency carrier, or per BWP.

In some implementations, one default setting (e.g., one of the Cases 1 to 5 described above) may be (re) configured by the serving RAN as part of the configuration of the L1 power saving mechanisms. In some implementations, different default settings may also be configured by the serving RAN based on the proposed granularity, e.g., per UE, per MAC entity, per cell group, per cell, per frequency carrier, per BWP, or per band combination. In some implementations, the serving RAN may instruct the UE to (dynamically) switch from one DCI decoding rule to another (e.g., between Cases 1 to 5) by DL (UE-specific) control signaling (e.g., UE-specific DL RRC signaling, MAC CE, or DCI) based on the proposed granularity (e.g., per UE, per MAC entity, per cell group, per cell, per frequency carrier, or per BWP), and after receiving this instruction, the UE may change the DCI decoding rule after a short processing time (e.g., $N_S$ symbol(s), slot(s), frame(s), subframes(s), or millisecond(s)). In some implementations, the value of $N_S$ may be pre-defined (e.g., pre-defined in 3GPP TSs or in the hardware/software module in the UE side), or may be configured by the serving RAN (e.g., as part of the configuration of the L1 power saving mechanism, or as part of the switch instruction to change the DCI decoding rule).

In some implementations, the serving RAN may configure the above-described Cases 1 to 5, respectively, based on the UE capability. In some implementations, the UE may need to report its capability about whether it supports each of the above-described Cases 1 to 5, respectively.

In some implementations, one IE (e.g., a bitmap or a sequence) may be reported by the UE (e.g., via UEAssistanceInformation or UECapabilityInformation) to the serving cell.

It should be appreciated that the present disclosure proposes control mechanisms to address the co-existence issue in which both R-16 and R-17 L1 power saving mechanisms are supported by the UE and serving RAN. It should be noted that the proposed control mechanisms may not be limited to the R-16 and R-17 L1 power saving mechanisms for 5G NR, and may also be applicable to other wireless communication technologies, such as E-UTRA, NB-IoT, and Wi-Fi.

Figure 5:
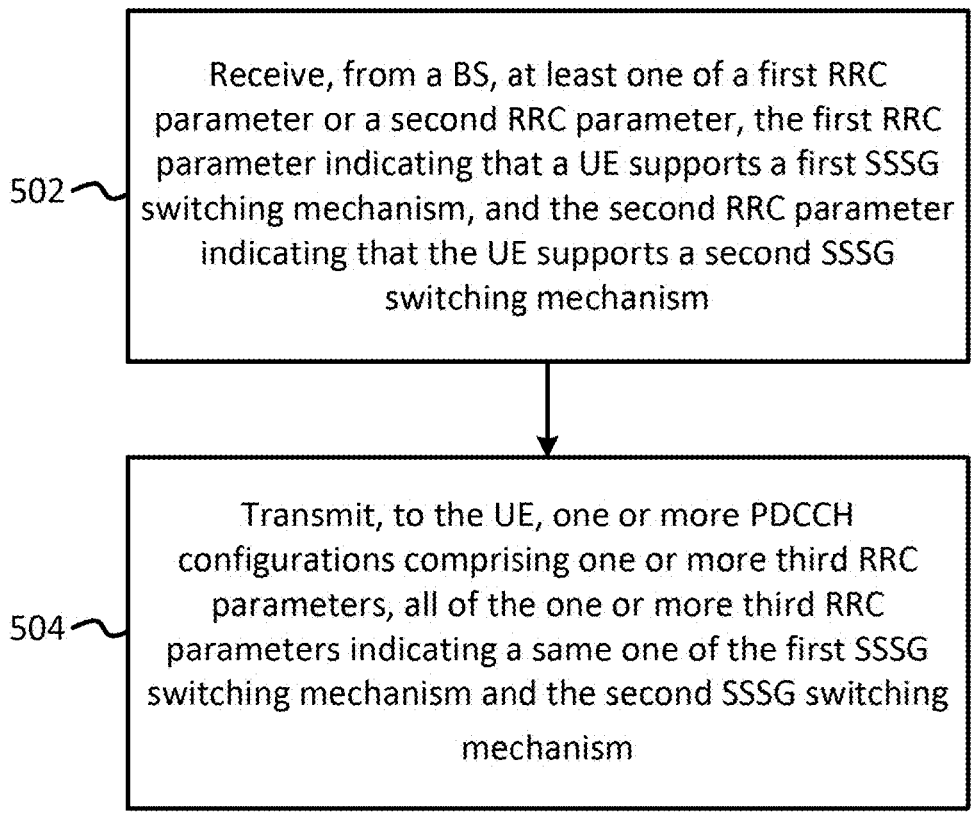
FIG. 5 is a flowchart illustrating a method/process performed by a BS for power saving configuration, according to an example implementation of the present disclosure.

FIG. 5 is a flowchart illustrating a method/process 500 performed by a BS for power saving configuration, according to an example implementation of the present disclosure. In action 502, a BS may receive at least one of a first RRC parameter or a second RRC parameter, the first RRC parameter indicating that a UE supports a first SSSG switching mechanism, and the second RRC parameter indicating that the UE supports a second SSSG switching mechanism. In action 504, the BS may transmit, to the UE, one or more PDCCH configurations comprising one or more third RRC parameters, all of the one or more third RRC parameters indicating a same one of the first SSSG switching mechanism and the second SSSG switching mechanism.

In some implementations, the first SSSG switching mechanism may be in compliance with release 16 of 3GPP TS for 5G NR, and the second SSSG switching mechanism may be in compliance with release 17 of 3GPP TS for 5G NR.

In some implementations, the UE may be configured with one or more cell groups (e.g., MCG and/or SCG(s)), and the same one of the first SSSG switching mechanism and the second SSSG switching mechanism may be applied to all of the one or more cell groups.

In some implementations, the UE may be configured with a plurality of frequency carriers, each of the plurality of frequency carriers may be on a licensed band or an unlicensed band, and the same one of the first SSSG switching mechanism and the second SSSG switching mechanism may be applied to all of the plurality of frequency carriers.

In some implementations, the UE may be configured with one or more DL BWPs associated with a serving cell, and the same one of the first SSSG switching mechanism and the second SSSG switching mechanism may be applied to all of the one or more DL BWPs.

In some implementations, the second RRC parameter may further indicate that the UE supports PDCCH skipping.

In some implementations, the one or more third RRC parameters in different PDCCH configurations may be configured with different or same content values.

Figure 6:
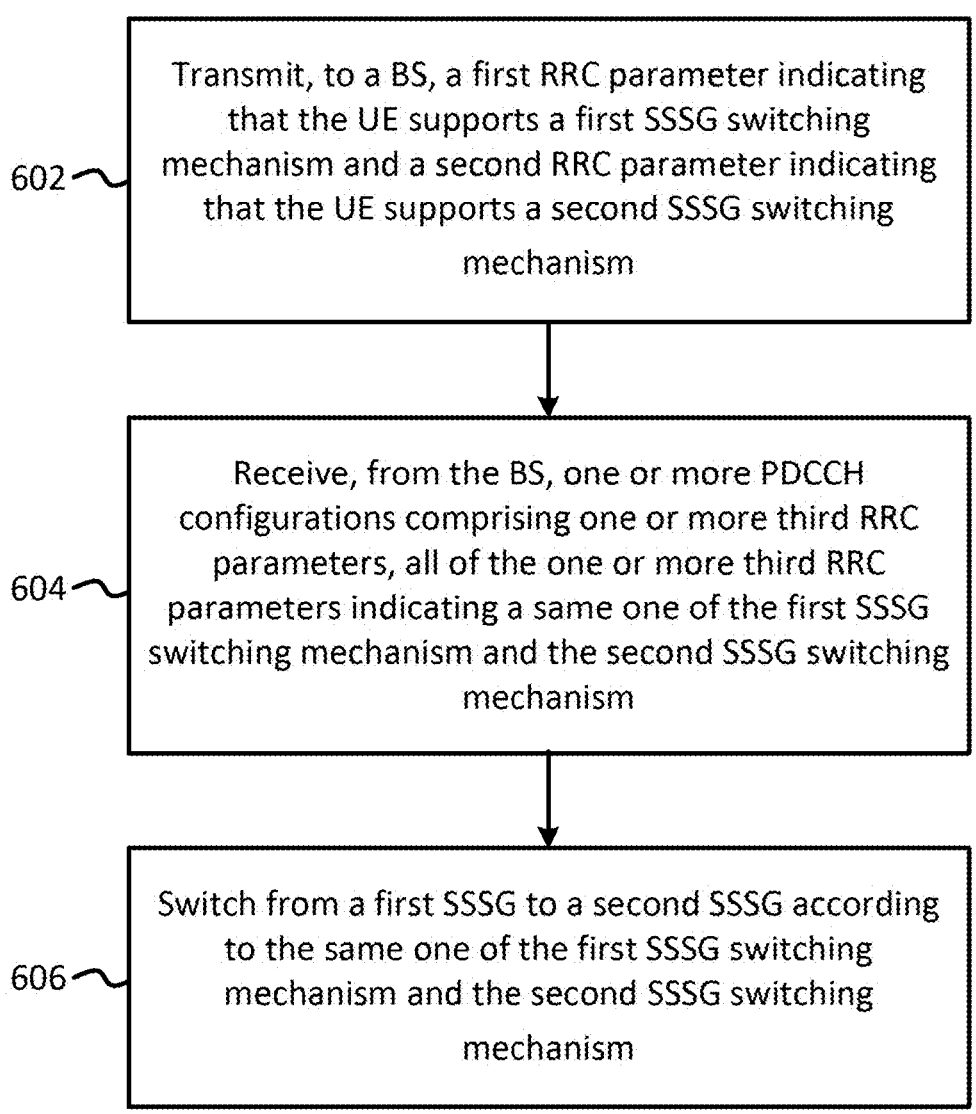
FIG. 6 is a flowchart illustrating a method/process performed by a UE for power saving configuration, according to an example implementation of the present disclosure.

FIG. 6 is a flowchart illustrating a method/process 600 performed by a UE for power saving configuration, according to an example implementation of the present disclosure. In action 602, a UE may transmit, to a BS, a first RRC parameter indicating that the UE supports a first SSSG switching mechanism and a second RRC parameter indicating that the UE supports a second SSSG switching mechanism. In action 604, the UE may receive, from the BS, one or more PDCCH configurations comprising one or more third RRC parameters, all of the one or more third RRC parameters indicating a same one of the first SSSG switching mechanism and the second SSSG switching mechanism. In action 606, the UE may switch from a first SSSG to a second SSSG according to the same one of the first SSSG switching mechanism and the second SSSG switching mechanism.

In some implementations, the first SSSG switching mechanism may be in compliance with release 16 of 3GPP TS for 5G NR, and the second SSSG switching mechanism may be in compliance with release 17 of 3GPP TS for 5G NR.

In some implementations, the UE may be configured with one or more cell groups (e.g., MCG and/or SCG(s)), and the same one of the first SSSG switching mechanism and the second SSSG switching mechanism may be applied to all of the one or more cell groups.

In some implementations, the UE may be configured with a plurality of frequency carriers, each of the plurality of frequency carriers may be on a licensed band or an unlicensed band, and the same one of the first SSSG switching mechanism and the second SSSG switching mechanism may be applied to all of the plurality of frequency carriers.

In some implementations, the UE may be configured with one or more DL BWPs associated with a serving cell, and the same one of the first SSSG switching mechanism and the second SSSG switching mechanism may be applied to all of the one or more DL BWPs.

In some implementations, the one or more third RRC parameters in different PDCCH configurations may be configured with different or same content values.

Figure 7:
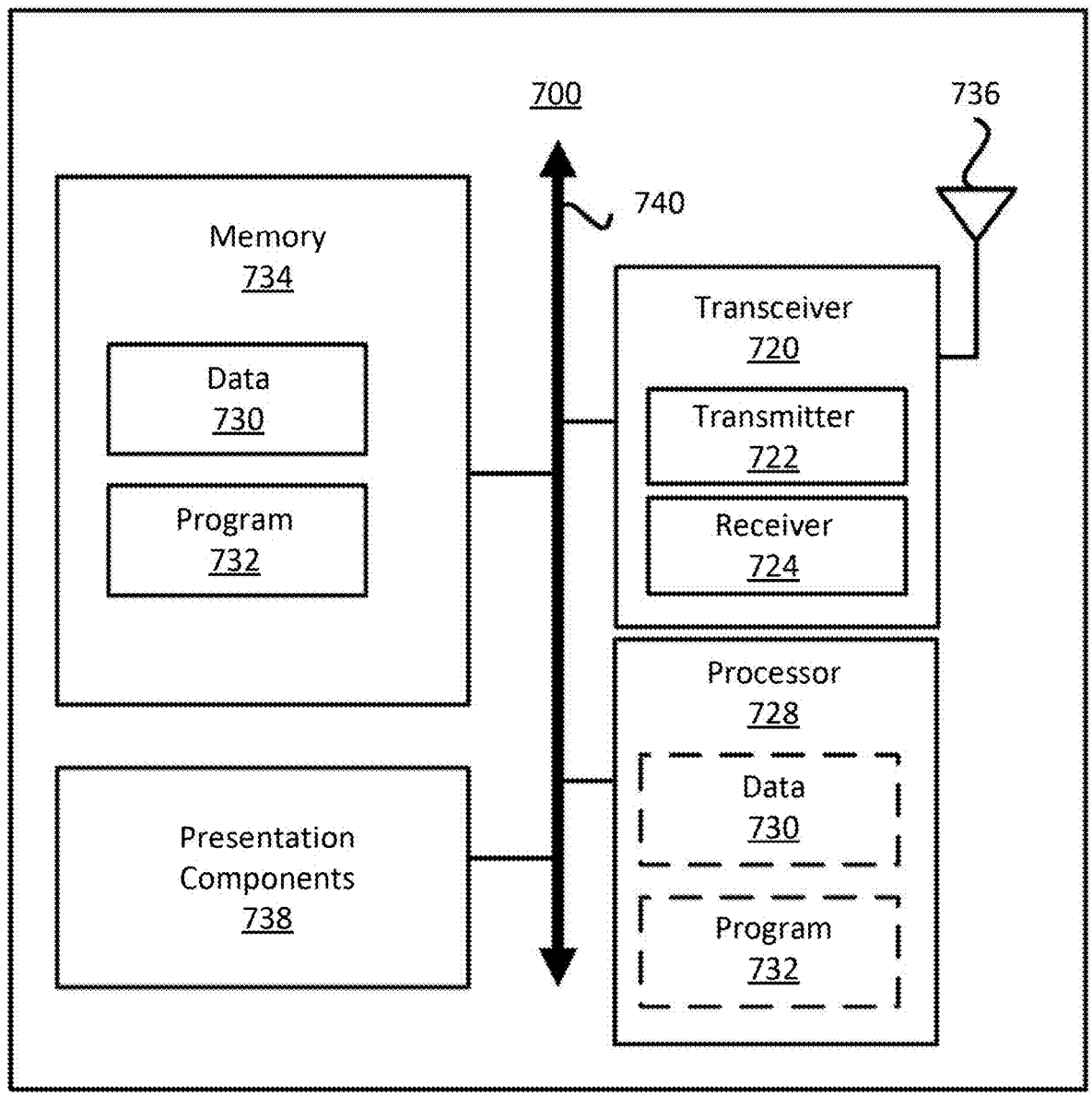
FIG. 7 is a block diagram illustrating a node for wireless communication in accordance with various aspects of the present disclosure.

FIG. 7 is a block diagram illustrating a node 700 for wireless communication in accordance with various aspects of the present disclosure. As illustrated in FIG. 7, a node 700 may include a transceiver 720, a processor 728, a memory 734, one or more presentation components 738, and at least one antenna 736. The node 700 may also include an RF spectrum band module, a BS communications module, a network communications module, and a system communications management module, Input/Output (I/O) ports, I/O components, and a power supply (not illustrated in FIG. 7).

Each of the components may directly or indirectly communicate with each other over one or more buses 740. The node 700 may be a UE or a BS that performs various functions disclosed with reference to FIGS. 1 through 6.

The transceiver 720 has a transmitter 722 (e.g., transmitting/transmission circuitry) and a receiver 724 (e.g., receiving/reception circuitry) and may be configured to transmit and/or receive time and/or frequency resource partitioning information. The transceiver 720 may be configured to transmit in different types of subframes and slots including but not limited to usable, non-usable, and flexibly usable subframes and slot formats. The transceiver 720 may be configured to receive data and control channels.

The node 700 may include a variety of computer-readable media. Computer-readable media may be any available media that may be accessed by the node 700 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules, or data.

Computer-storage media may include random access memory (RAM), read-only memory (ROM), erasable-programmable ROM (EPROM), electrically-erasable-programmable ROM (EEPROM), flash memory (or other memory technology), compact-disc-ROM (CD-ROM), digital versatile disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared and other wireless media. Combinations of any of the previously listed components should also be included within the scope of computer-readable media.

The memory 734 may include computer-storage media in the form of volatile and/or non-volatile memory. The memory 734 may be removable, non-removable, or a combination thereof. Example memory may include solid-state memory, hard drives, optical-disc drives, etc. As illustrated in FIG. 7, the memory 734 may store a computer-readable and/or computer-executable program 732 (e.g., software codes) that are configured to, when executed, cause the processor 728 to perform various functions disclosed herein, for example, with reference to FIGS. 1 through 6. Alternatively, the program 732 may not be directly executable by the processor 728 but may be configured to cause the node 700 (e.g., when compiled and executed) to perform various functions disclosed herein.

The processor 728 (e.g., having processing circuitry) may include an intelligent hardware device, e.g., a Central Processing Unit (CPU), a microcontroller, an ASIC, etc. The processor 728 may include memory. The processor 728 may process the data 730 and the program 732 received from the memory 734, and information transmitted and received via the transceiver 720, the baseband communications module, and/or the network communications module. The processor 728 may also process information to send to the transceiver 720 for transmission via the antenna 736 to the network communications module for transmission to a CN.

One or more presentation components 738 may present data indications to a person or another device. Examples of presentation components 738 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed, and many rearrangements, modifications, and substitutions are possible without departing from the scope of the present disclosure.

What is claimed is:

1. A method performed by a base station (BS) for power saving configuration, the method comprising:
   receiving at least one of a first radio resource control (RRC) parameter or a second RRC parameter, the first RRC parameter indicating that a user equipment (UE) supports a first search space set group (SSSG) switching mechanism, and the second RRC parameter indicating that the UE supports a second SSSG switching mechanism; and
   transmitting, to the UE, one or more physical downlink control channel (PDCCH) configurations, each comprising one or more third RRC parameters, all of the one or more third RRC parameters indicating a same one of the first SSSG switching mechanism or the second SSSG switching mechanism,
   wherein the first SSSG switching mechanism is in compliance with Release 16 of Third Generation Partnership Project (3GPP) Technical Specification (TS) for Fifth Generation (5G) New Radio (NR), and the second SSSG switching mechanism is in compliance with Release 17 of 3GPP TS for 5G NR.

2. The method of claim 1, wherein:
   the UE is configured with one or more cell groups, and
   the same one of the first SSSG switching mechanism or the second SSSG switching mechanism is applied to all of the one or more cell groups.

3. The method of claim 1, wherein:
   the UE is configured with a plurality of frequency carriers, each of the plurality of frequency carriers is on a licensed band or an unlicensed band, and
   the same one of the first SSSG switching mechanism or the second SSSG switching mechanism is applied to all of the plurality of frequency carriers.

4. The method of claim 1, wherein:
   the UE is configured with one or more downlink (DL) bandwidth parts (BWPs) associated with a serving cell, and
   the same one of the first SSSG switching mechanism or the second SSSG switching mechanism is applied to all of the one or more DL BWPs.

5. The method of claim 1, wherein the second RRC parameter further indicates that the UE supports PDCCH skipping.

6. The method of claim 1, wherein the one or more third RRC parameters in different ones of the one or more PDCCH configurations are configured with different or same content values.

7. A base station (BS) for power saving configuration, the BS comprising:
- at least one processor; and
- at least one non-transitory computer-readable medium coupled to at least one processer and storing one or more computer-executable instructions that, when executed by the at least one processer, cause the BS to:
- receive at least one of a first radio resource control (RRC) parameter or a second RRC parameter, the first RRC parameter indicating that a user equipment (UE) supports a first search space set group (SSSG) switching mechanism, and the second RRC parameter indicating that the UE supports a second SSSG switching mechanism; and
- transmit, to the UE, one or more physical downlink control channel (PDCCH) configurations, each comprising one or more third RRC parameters, all of the one or more third RRC parameters indicating a same one of the first SSSG switching mechanism or the second SSSG switching mechanism,
- wherein the first SSSG switching mechanism is in compliance with Release 16 of third Generation Partnership Project (3GPP) Technical Specification (TS) for Fifth Generation (5G) New Radio (NR), and the second SSSG switching mechanism is in compliance with Release 17 of 3GPP TS for 5G NR.

8. The BS of claim 7, wherein:
the UE is configured with one or more cell groups, and
the same one of the first SSSG switching mechanism or the second SSSG switching mechanism is applied to all of the one or more cell groups.

9. The BS of claim 7, wherein:
the UE is configured with a plurality of frequency carriers,
each of the plurality of frequency carriers is on a licensed band or an unlicensed band, and
the same one of the first SSSG switching mechanism or the second SSSG switching mechanism is applied to all of the plurality of frequency carriers.

10. The BS of claim 7, wherein:
the UE is configured with one or more downlink (DL) bandwidth parts (BWPs) associated with a serving cell, and
the same one of the first SSSG switching mechanism or the second SSSG switching mechanism is applied to all of the one or more DL BWPs.

11. The BS of claim 7, wherein the second RRC parameter further indicates that the UE supports PDCCH skipping.

12. The BS of claim 7, wherein the one or more third RRC parameters in different ones of the one or more PDCCH configurations are configured with different or same content values.

13. A method performed by a user equipment (UE) for power saving configuration, the method comprising:
- transmitting, to a base station (BS), a first Radio Resource Control (RRC) parameter indicating that the UE supports a first search space set group (SSSG) switching mechanism and a second RRC parameter indicating that the UE supports a second SSSG switching mechanism;
- receiving, from the BS, one or more physical downlink control channel (PDCCH) configurations, each comprising one or more third RRC parameters, all of the one or more third RRC parameters indicating a same one of the first SSSG switching mechanism or the second SSSG switching mechanism; and
- switching from a first SSSG to a second SSSG according to the same one of the first SSSG switching mechanism or the second SSSG switching mechanism,
- wherein the first SSSG switching mechanism is in compliance with Release 16 of third Generation Partnership Project (3GPP) Technical Specification (TS) for Fifth Generation (5G) New Radio (NR), and the second SSSG switching mechanism is in compliance with Release 17 of 3GPP TS for 5G NR.

14. The method of claim 13, wherein:
the UE is configured with one or more cell groups, and
the same one of the first SSSG switching mechanism or the second SSSG switching mechanism is applied to all of the one or more cell groups.

15. The method of claim 13, wherein:
the UE is configured with a plurality of frequency carriers,
each of the plurality of frequency carriers is on a licensed band or an unlicensed band, and
the same one of the first SSSG switching mechanism or the second SSSG switching mechanism is applied to all of the plurality of frequency carriers.

16. The method of claim 13, wherein:
the UE is configured with one or more downlink (DL) bandwidth parts (BWPs) associated with a serving cell, and
the same one of the first SSSG switching mechanism or the second SSSG switching mechanism is applied to all of the one or more DL BWPs.

17. The method of claim 13, wherein the one or more third RRC parameters in different ones of the one or more PDCCH configurations are configured with different or same content values.

* * * * *